United States Patent [19]

Yuen

[11] Patent Number: 5,033,709

[45] Date of Patent: Jul. 23, 1991

[54] HOLDING DEVICE

[76] Inventor: Michael M. Yuen, c/o JWP Auto Dynamics, 2034 W. Valley Blvd., Alhamba, Calif. 91803

[21] Appl. No.: 575,300

[22] Filed: Aug. 29, 1990

[51] Int. Cl.⁵ .......................................... A47G 29/00
[52] U.S. Cl. .................................. 248/313; 248/316.4; 248/311.2; 248/902; 224/42.45 R; 379/454; 269/254 R
[58] Field of Search ............. 224/42.45 R, 273, 42.42, 224/42.43, 42.44; 379/446, 449, 454, 455; 248/316.4, 316.6, 313, 311.2, 902; 269/139, 153, 254 R

[56] References Cited

U.S. PATENT DOCUMENTS

| 308,205 | 5/1990 | Tholberg . | |
|---|---|---|---|
| 1,026,260 | 5/1912 | Guthrie | 379/454 |
| 2,481,271 | 9/1949 | Willey . | |
| 2,509,793 | 5/1950 | Yost | 248/902 |
| 2,597,670 | 5/1952 | Pinto . | |
| 2,663,764 | 12/1953 | Holmes | 379/455 |
| 2,792,932 | 5/1957 | Freistat | 269/254 R |
| 3,040,900 | 6/1962 | Jones | 248/316.4 |
| 3,184,548 | 5/1965 | Krulwich . | |
| 3,433,446 | 3/1969 | Meder | 248/316.3 |
| 4,023,757 | 5/1977 | Allard et al. . | |
| 4,472,606 | 9/1984 | Krolopp et al. . | |
| 4,776,553 | 10/1988 | Kobayashi . | |
| 4,842,174 | 6/1989 | Sheppard et al. . | |
| 4,845,738 | 7/1989 | Takano . | |
| 4,878,237 | 10/1989 | Cianflone . | |
| 4,892,486 | 1/1990 | Guzik et al. . | |

FOREIGN PATENT DOCUMENTS 2403697  4/1979  France ................... 379/454

Primary Examiner—Linda J. Sholl
Attorney, Agent, or Firm—Ladas & Parry

[57] ABSTRACT

A holder typically for a portable telephone comprises an upper housing and a lower housing, the latter being adapted for fixing to a surface or object. The upper housing comprises a support plate upon which the telephone may be located, and a pair of movable gripper members which urge the telephone against a fixed member so as to be held firmly therebetween. The distance between the fixed member and movable gripper members may be varied according to the dimensions of the telephone which the holder is receiving, and biasing means on the movable gripper members are provided to insure that there is sufficient force to firmly hold the telephone in the holder between the movable and fixed gripper members.

18 Claims, 7 Drawing Sheets

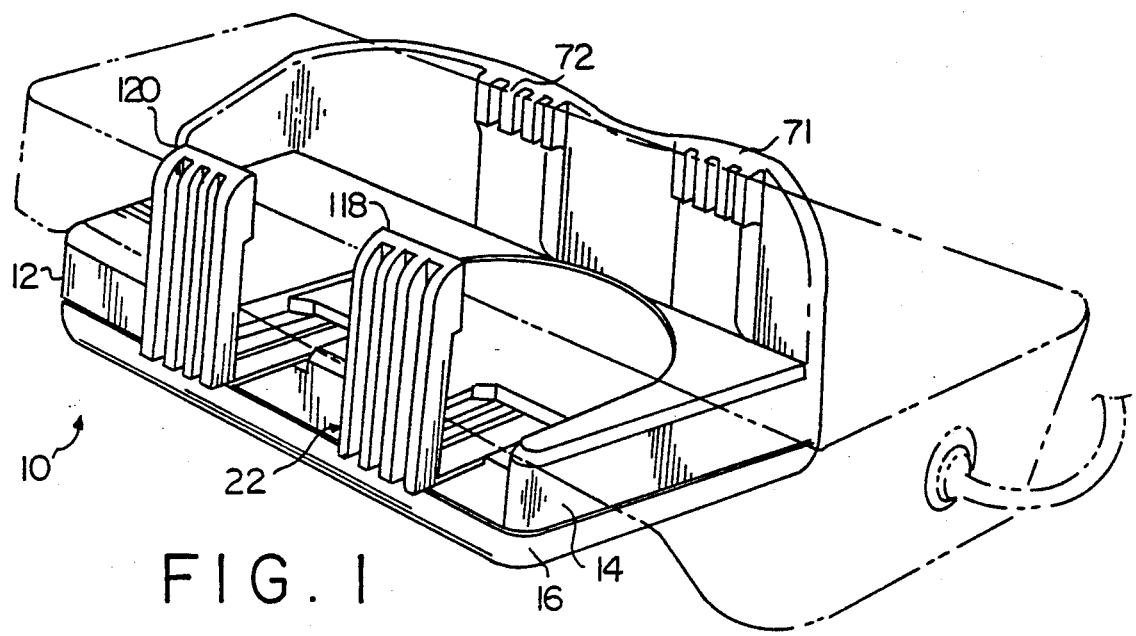
FIG. I
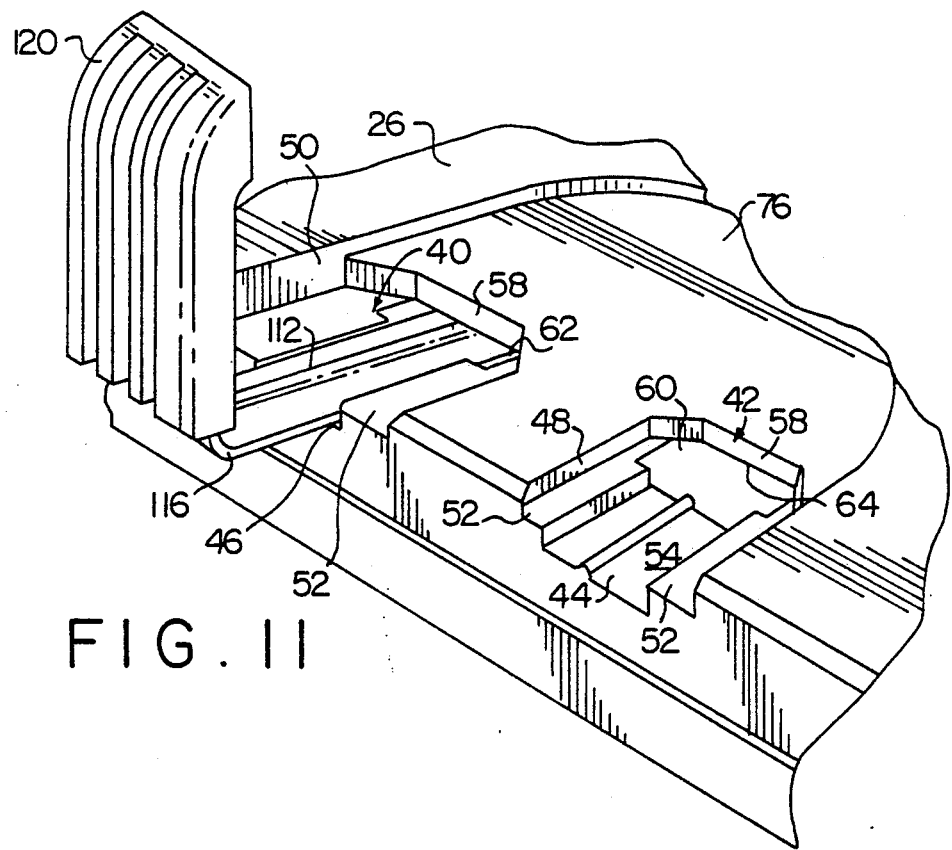
FIG. II

HOLDING DEVICE

FIELD AND BACKGROUND OF THE INVENTION

This invention relates to a holding device that is particularly useful for holding in position, for example, telephones or other communication equipment, such as those typically used in vehicles including cars, boats and aircraft. The holding device of the invention is adapted to receive and hold devices of differing size and is not confined to any specific device of given dimensions.

In recent years, there has been a considerable increase in the number and use of telephones in transport and private vehicles. Typically, a telephone of the type used in vehicles is of basically rectangular shape, with a substantially flat side including a mouth piece, a speaker and digit buttons. While telephones for use in vehicles have the same basic configuration, there is a fairly wide spectrum of sizes of such telephones produced by various manufacturers. Thus, details as to shape, width of the telephone and thickness thereof vary according to manufacturer.

Whether located in a vehicle, office, home or other place, it is very useful to have a firm and secure storing area for such telephone or other equipment. However, as a result of the variety of shapes and sizes, a specific holder is typically required for a telephone of given dimensions. Conceivably, therefore, a different and customized holder for firmly maintaining the telephone in the correct, secure position in a vehicle, for example, is required for each telephone instrument of a particular size. Further, once a particular telephone holder has been installed in a vehicle, it is only adapted to receive telephone instruments of a specific size, and no other telephone instruments of differing size could be stored in the holder.

It is an object of the present invention to provide a holding device suitable for portable telephones, and preferably a holding device which is easily adjustable so as to receive and securely retain different telephone instruments which may vary in size.

SUMMARY OF THE INVENTION

According to one aspect of the invention, there is provided a holding device for receiving and holding objects of differing dimensions, the device comprising: a housing, including a surface for receiving the object; fixed gripper means on the housing; movable gripper means movable between a first position wherein the movable and fixed gripper means are spaced apart from each other, and a second position wherein the movable and fixed gripper members are spaced apart by a distance greater than that in the first position; biasing means for biasing the movable gripper means towards the first position.

Preferably, the housing comprises an upper body member which defines the surface and a lower body member affixed to the upper body member, the upper and lower body members defining a chamber, the surface on the housing is substantially rectangular in shape, and the fixed gripper means is located at one side of the upper body member.

Preferably, the movable gripper means comprises a movable arm assembly, the surface of the housing includes a slot, the movable arm assembly being located in the slot so that a portion thereof is inside the chamber, and the remaining portion thereof outside of the chamber. The movable arm assembly may comprise a U-shaped member having a web portion and two extending arm portions, each extending arm portion having a gripper member at the free end thereof, the web portion being located in the chamber and the gripper members being outside of the chamber, the U-shaped member being movable in the slot such that the two extending arm portions may move between the inside and the outside of the chamber. Conveniently, two slots are provided in the surface of the housing, each slot being adapted to receive one of the extending arm portions of the U-shaped member and the fixed gripper means is located on one side of the housing, and the gripper members are on the opposite side of the housing and movable so as to vary the distance between the fixed gripper means and the gripper members.

Each extending arm portion may have an elongate raised ridge thereon, the housing has a pair of elongate grooves on an inner surface thereof, each raised ridge being adapted for receipt in a groove thereby facilitating accurate and controlled movement of the U-shaped member between the first and second positions. The device may further comprise a central groove, the web portion having a protrusion approximately midway along its length, the protrusion being received in the central groove to further facilitate accurate movement of the U-shaped member between the first and second positions.

Preferably, the biasing means comprises a spring mounted on the web portion of the U-shaped member, one portion of the spring acting on the web portion, and the other portion of the spring acting on the housing, wherein the spring is arranged so as to bias the U-shaped member toward the first position. The spring may comprise a coil spring with two radiating spring arms, the coil spring being bolted to the web portion with the radiating arms being received in spring securing means on the housing. Conveniently, the spring securing means comprises: a first pair of upstanding projections adjacent an extending arm, the upstanding projections defining a gap therebetween for receiving one radiating spring arm, and a second pair of upstanding projections located adjacent the other extending arm, the second pair of upstanding projections defining a gap therebetween for receiving the other radiating spring arm.

BRIEF DESCRIPTION OF THE DRAWINGS

FIG. 1 is a perspective view of a portable telephone holder of the invention.

FIG. 11 is a detail perspective view, partially in cross section, of a portion of the upper housing of the telephone holder.

DETAILED DESCRIPTION OF THE PREFERRED EMBODIMENT

Figure 2:
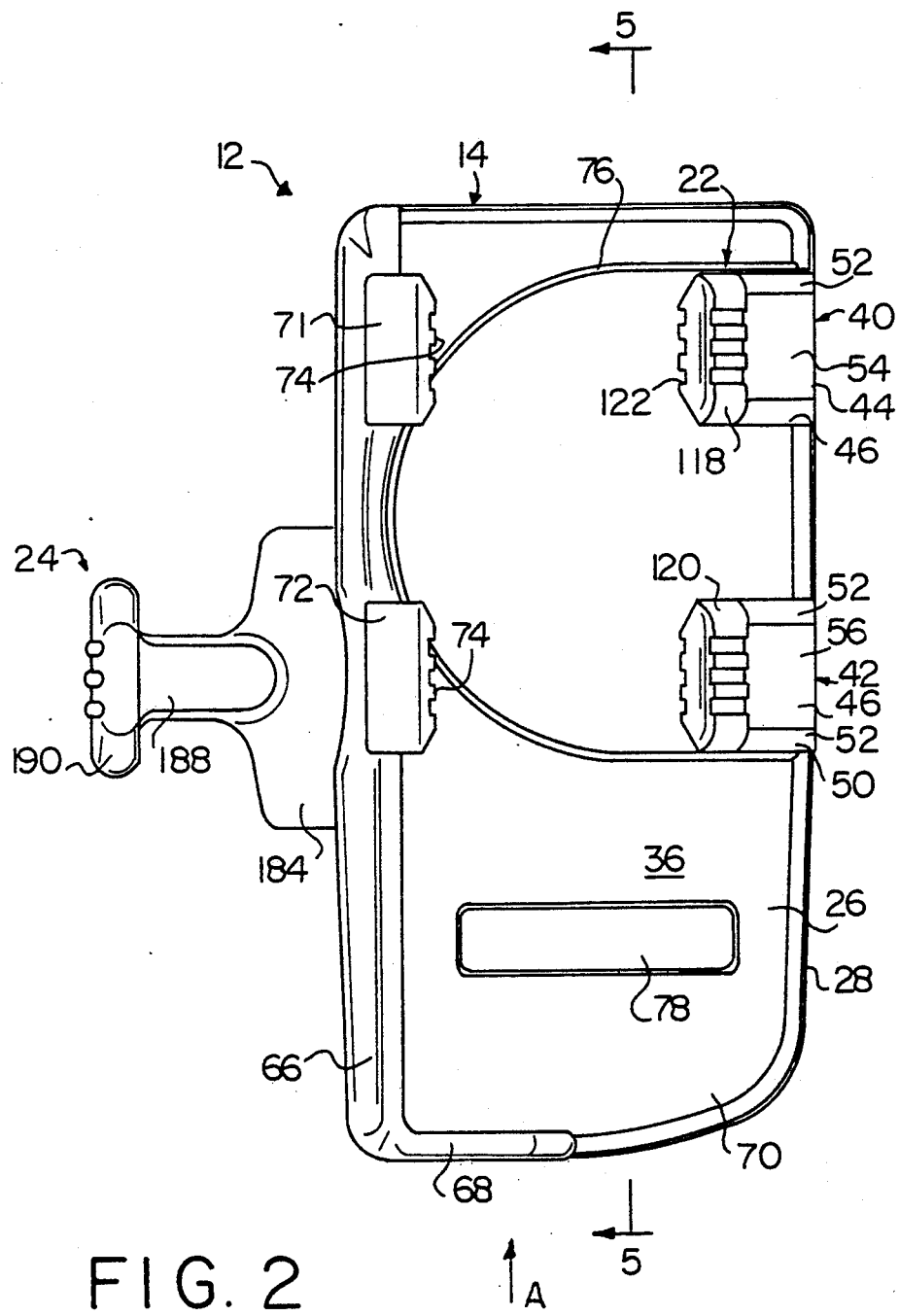
FIG. 2 is a top view of the telephone holder shown in FIG. 1 with arm assembly in the withdrawn position.

Referring now to the drawings, there is shown a telephone holder 10, generally comprising a housing 12 having an upper body 14, and a lower body 16 joined to the upper body 14. The lower body 16 is adapted for attachment to a base plate 18 located at the end of a gooseneck or flexible tube 20 which may be fixed to a vehicle (not shown).

Figure 3:
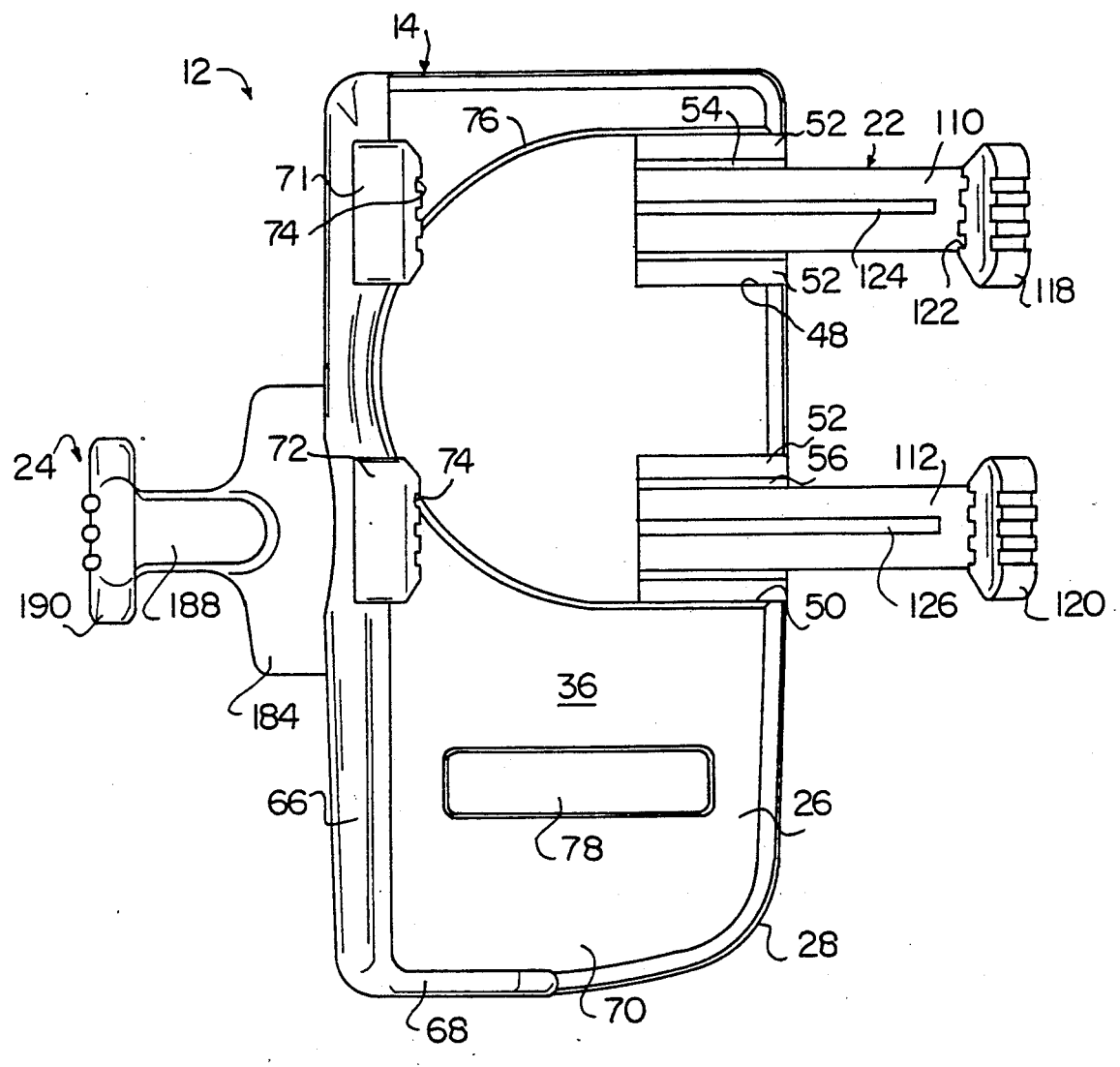
FIG. 3 is a top view of the telephone holder shown in FIG. 1 with arm assembly in the extended position.
Figure 4:
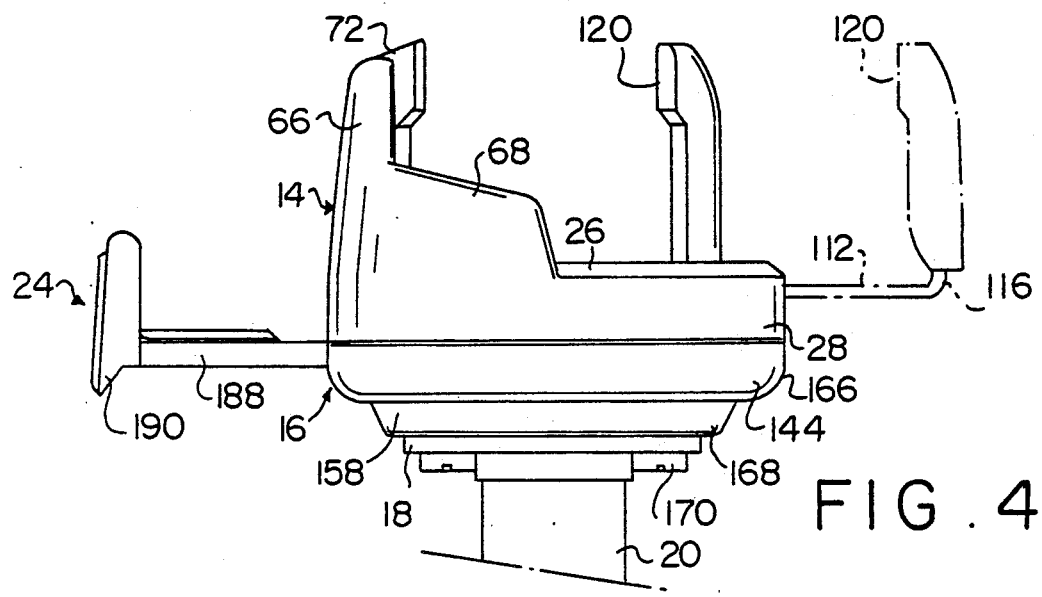
FIG. 4 is an end view of the telephone holder shown in FIG. 1, viewed from arrow A in FIG. 1.

The upper body 14 has attached thereto a movable arm assembly 22, adapted to move between a withdrawn position, as shown in FIG. 2, and an extended position, as shown in FIG. 3. The movable arm assembly 22 is biased so as to normally be urged into the withdrawn position. The telephone holder 10 further comprises a retractable hook 24 which is movable between an open and closed position with respect to the housing 12.

The upper body 14 comprises a support plate 26 having a downwardly depending sidewall 28, the support plate 26 and sidewall 28 defining an upper body cavity 30. Within the upper body cavity 30 there is located a pair of internally threaded cylindrical securing members 32 adapted to receive a screw 34 whereby the upper and lower bodies 14 and 16 are secured to each other. The support plate 26 has an outer surface 36 and an inner surface 38. The cylindrical securing members 32 extend downwardly into the upper body cavity 30 from the inner surface 38 of the support plate 26.

A pair of recessed portions 40 and 42 (best shown in FIG. 11) are located in the support plate 26. Each recessed portion 40 and 42 has a bottom wall 44 and 46 and sidewalls 48 and 50. A stepped portion 52 is located on each of the bottom walls 44 and 46 at the sides thereof, and two stepped portions 52 in each recessed portion 40 and 42 define channels 54 and 56. An end wall 58 of each recessed portion 40 and 42 extends downwardly to approximately the upper level of the stepped portions 52. Slotted apertures 60 and 62 are defined in each recessed portion 40 and 42 between the bottom walls 44 and 46 defining the channels 54 and 56, and the lower end 64 of the end wall 58. The movable arm assembly 22 extends outwardly from the upper body cavity 30, through the slotted apertures 60 and 62 to the outside of the housing 12, as will be discussed more fully below.

A lateral upstanding wall 66 is located along an edge of the support plate 26, and an end upstanding wall 68 extends partially across the lower end 70 of the support plate 26. Mounted in the lateral upstanding wall 66 is a pair of fixed gripper members 71 and 72, comprised of a rubber material, each fixed gripper member 71 and 72 including a series of longitudinal channels 74 which facilitate the gripping action. The outer surface 36 of the support plate 26 has a substantially semi-circular recess 76, and, near the lower end 70 of the support plate 26, a substantially rectangular recess 78 is constructed into the outer surface 36.

Figure 6:
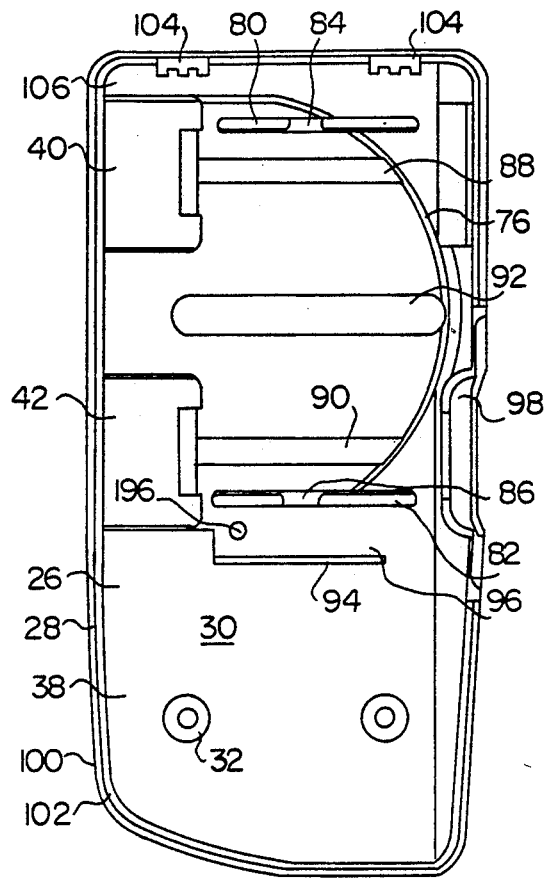
FIG. 6 is an underview of the top portion of the housing with the moving arm assembly removed.

Reference is now made to the inner surface 38 of the support plate 26, best illustrated in FIG. 6 of the drawings. Two elongate ridged projections 80 and 82 depend downwardly from the inner surface 38, each of the ridged projections 80 and 82 being adjacent recessed portions 40 and 42 respectively. Each ridged projection 80 and 82 has approximately midway along its length a gap 84 and 86. Between the ridged projections 80 and 82, there is a provided a pair of grooved tracks 88 and 90, and a central track 92 between the grooved tracks 88 and 90. Towards the lower end 70 of the support plate 26, a flange wall 94 is provided whereby a rectangular space 96 is defined between ridged projection 82 and flange wall 94.

The sidewall 28 of the upper housing 14 has, below the lateral upstanding wall 66, and approximately midway therealong, a hook recess 98 to accommodate a portion of the retractable hook 24. Further, the outer edge 100 of the sidewall 28 has a shelf portion 102 around its periphery, which facilitates the connection between the upper housing 14 and lower housing 16 in a manner to be described. To further facilitate a firm connection between the upper and lower housings 14 and 16, two retention clips 104 are 10 fixed to the sidewall 28 at the upper end 106 of the support plate 26. The retention clips 104 fit into recesses (to be described) in the lower housing 16 to facilitate a precise and stable connection.

The movable arm assembly 22 is located within the upper body cavity 30 of the upper housing 14. The arm assembly 22 is generally of U-shape construction and includes a web portion 108 and two extending arms 110 and 112. Extending arm 110 passes through slotted aperture 60, while extending arm 112 passes through the slotted aperture 62. Outside of the housing, each arm 110 and 112 has an upstanding flange 114 and 116 respectively, upon which is mounted a movable gripper member 118 and 120. Each movable gripper member 118 and 120 includes a series of longitudinal channels 122. Movable gripper members 118 and 120 are directly opposite and opposed to the fixed gripper members 71 and 72.

The extending arm 110 has an elongate projection 124 running along the length thereof, which is received and rides in the grooved track 88. The extending arm 112 has an elongate projection 126 which is received and rides in the grooved track 90. From the above, it will be appreciated that the movable arm assembly 22 is capable of sideways movement relative to the upper housing 14, each arm 110 and 112 being movable in a direction parallel to the longitudinal axis of the arms, and normal to the longitudinal axis of the web portion 108.

Figure 5:
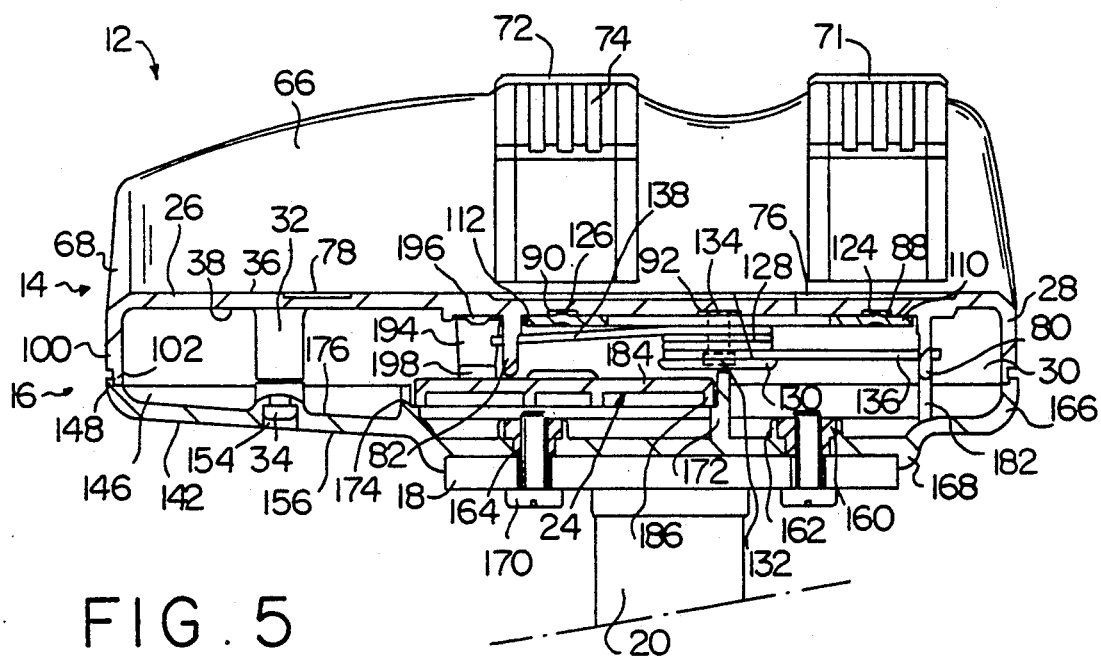
FIG. 5 is a cross-section through the telephone holder shown in FIG. 2 along lines 5—5 thereof.
Figure 7:
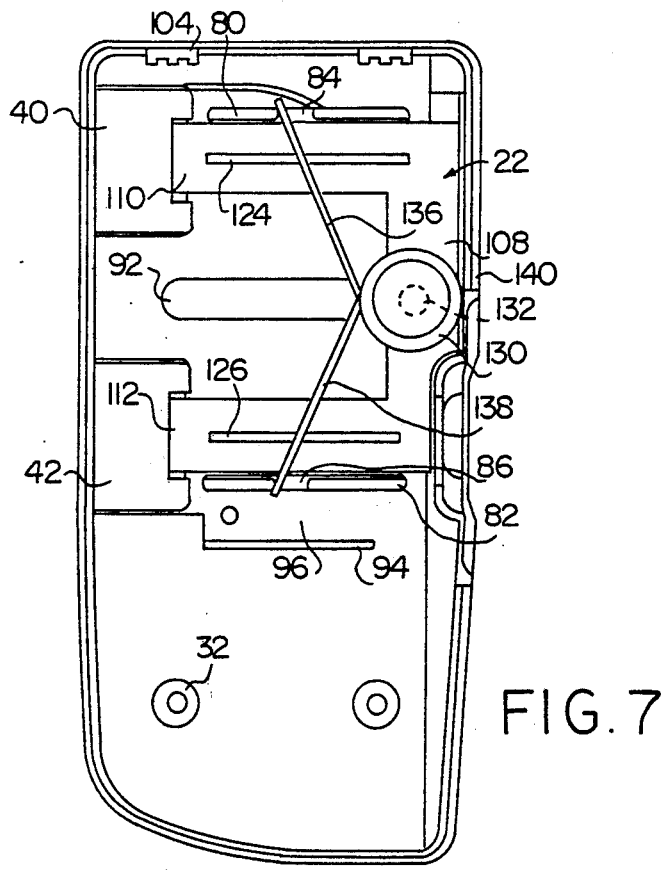
FIG. 7 is an underview of the top portion of the housing including the moving arm assembly, the moving arm assembly being shown in the withdrawn position.
Figure 8:
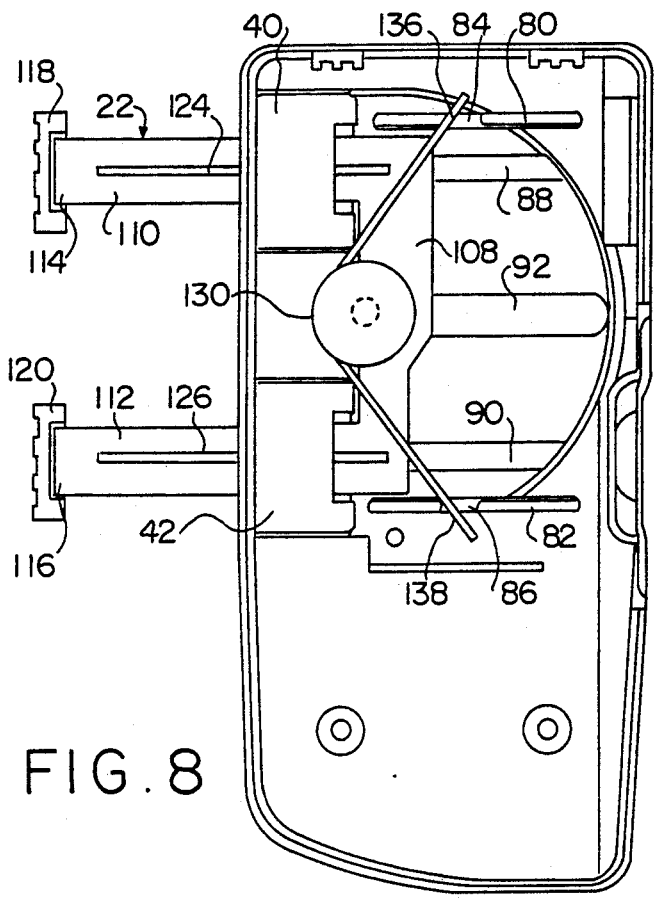
FIG. 8 shows the same view as FIG. 7, but with the moving arm assembly in the fully extended position.

A spring 128 is mounted on the web portion 108 of the movable arm assembly 22. The spring 128 is sandwiched between a clamp head 130 and the web portion 108, and is held in position by means of a threaded bolt 132. The threaded bolt 132 secures the spring 128 between the clamp head 130 and the web portion 108, and extends through the web portion a short distance beyond the surface thereof. This is best shown in FIG. 5 of the drawings. The end 134 of the bolt 132 extending beyond the web portion 108 rides in the central track 92, and further facilitates precise movement of the movable arm assembly 22 in the upper housing 14. The spring 128 incorporates a pair of radiating arms 136 and 138. The radiating arm 136 is received within the gap 84, while the radiating arm 138 is received within the gap 86. The spring 128 is arranged and biased so as to urge the arm assembly 22 towards side edge 140 of the upper housing, or, in other words, to keep the arm assembly 22 in the withdrawn position. Thus, when the arm assembly 22 is in the extended position, as shown in FIG. 8, the spring 128 with radiating arms 136 and 138 is under greater tension and, absent any other force, would urge the arm assembly 22 from the extended position shown in FIG. 8 to the withdrawn position shown in FIG. 7.

Figure 9:
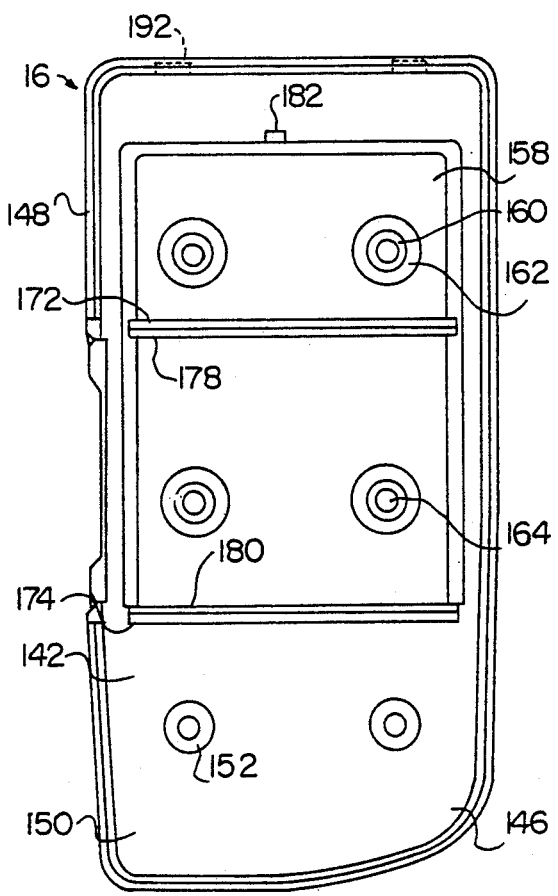
FIG. 9 is a top view of the lower portion of the housing with the spectacle hook assembly removed.
Figure 10:
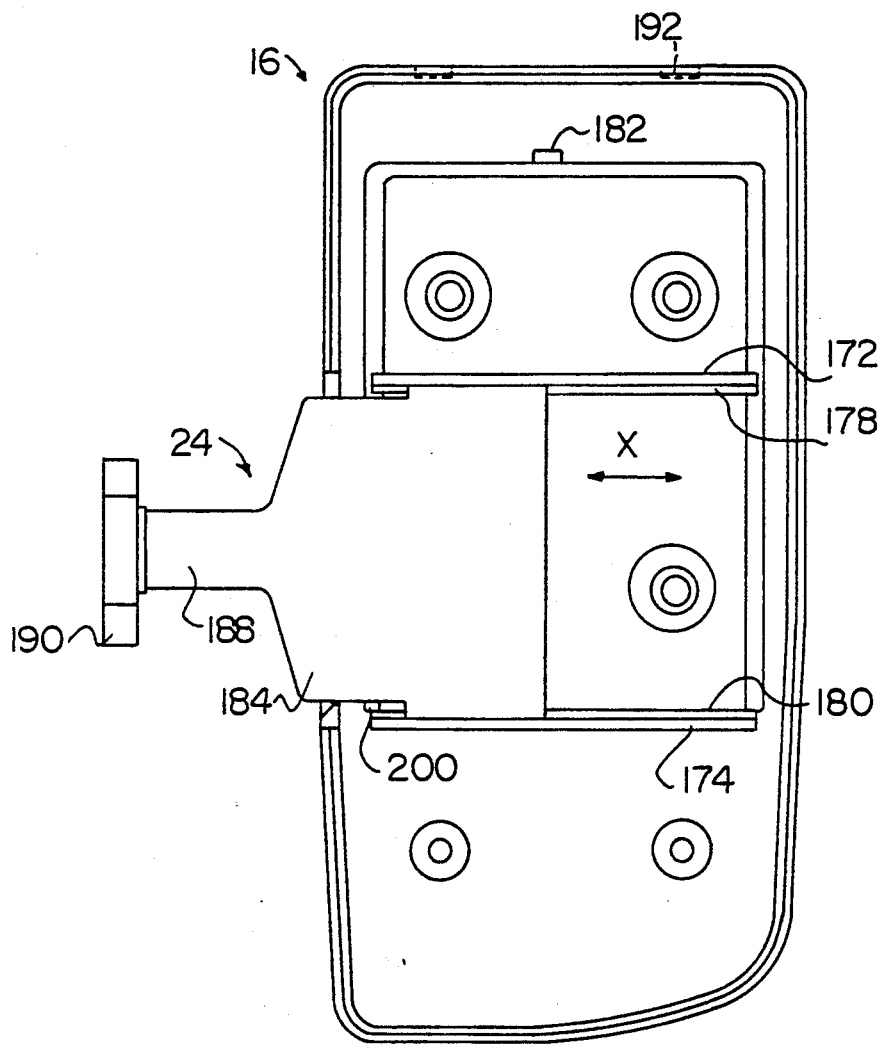
FIG. 10 is a top view of the lower portion of the housing with the spectacle hook, the spectacle hook being shown in the extended position.

Reference is now made to FIGS. 9 and 10 of the drawings, which illustrate the lower housing 16 of the telephone holder. The lower housing 16 has a base wall 142 and peripheral upstanding side walls 144, the base wall 142 and side wall 144 defining a lower body cavity 146. The upper edge of side wall 144 has a shelf portion 148 which registers with the shelf portion 102 of the upper housing 14. In the lower part 150 of the lower housing, there is located a pair of cylindrical securing members 152. The flat surface of securing member 152 registers with the flat surface of cylindrical member 32 depending from the support plate 26 of the upper housing 12 (best illustrated in FIG. 5), and the screw 34 extends through unthreaded securing member 152 and attaches to the internally threaded cylindrical securing member 32. The securing members 32 and 152 are each of a size which insures that the upper and lower housings 14 and 16 respectively are properly spaced from each other. A recessed well 154 is provided in the base wall 142 of the lower housing so that the screw 34 does not project beyond the outer surface 156 of the base wall 142.

The base wall 142 defines a rectangular shallow trough 158, and four nuts 160 are located in the trough, each nut being embedded in a projecting portion 162 of the base wall 142. There are four apertures 164 in the base wall 142 corresponding to each of the nuts 160. On the outer surface 166 of the base wall 142, a lip 168 is provided which defines a rectangle of the same size as the base plate 18. The base plate 18 is received within the periphery of the lip 168, and four bolts 170 are adapted to firmly connect the base plate 18 to the lower housing 16.

A pair of tracks 172 and 174 extend into the lower body cavity 146 from the inner surface 176 of the base wall 142. Each track 172 and 174 includes a shelf 178 and 180 respectively. There is also provided a flange 182 which, when the upper and lower housings 14 and 16 are joined, is directly below the ridged projection 80 at the area of the gap 84.

The retractable hook 24 comprises a flat plate portion 184 having depending side walls 186 (best illustrated in FIG. 5). The hook 24 further comprises a neck portion 188 and a frusto-conical shaped hook 190. The depending side walls 186 of the plate portion 184 are received on the shelves 178 and 180 of tracks 172 and 174. In this way, the retractable hook 24 is slidable between a withdrawn position wherein the hook 190 is substantially flush with the side wall 28 of the upper housing 14, and located in the hook recess 98, and an extended position wherein the hook 190 and neck portion 188 extend outwardly from the telephone holder. In the extended position, the hook and neck can be used for suspending spectacles or the like, and may be used in any convenient manner for storage.

The side wall 144 of the lower housing 16 has a pair of recesses 192 near the upper end thereof adapted to receive the retention clips 104 of the upper housing 14.

The upper and lower housings 14 and 16 are secured to each other in the following manner. The side walls 28 of the upper housing 14 and side wall 144 of the lower housing 16 are brought together, and the retention clips 104 inserted in recesses 192. The side walls 28 and 144 are brought together such that the shelf portion 102 of the upper housing 14 and shelf portion 148 of the lower housing 16 register The retractable hook 24 has been placed on the tracks 172 and 174 prior to assembly. The upper and lower housings 14 and 16 are thereafter bolted together by means of screws 34 and the upper and lower body cavities 30 and 146 define a single chamber. In the assembled condition, the flange 182 is immediately below the ridged projection 80 and has the effect of closing the gap 84, thus preventing the radiating arm 136 from becoming dislodged. The flat plate portion 184 of the retractable hook 24 abuts against the ridged projection 82, thus closing the gap 86 and preventing the radiating arm 138 from being dislodged. Even when the retractable hook 24 is in the extended position, the flat plate portion 184 will still seal the gap 86.

There is a tensioned metal strip spring 194 located in the rectangular space 96. The strip spring 194 is attached to the inner surface 38 to the support panel 26 by means of a plastic rivet 196. The strip spring 194 has a free end 198 which acts downwardly on the surface of the flat plate portion 184 thereby urging it into constant contact with the tracks 172 and 174. In this way, the retractable hook 24 is firmly held and will not rattle or move about in response to shaking or other movement. Stop member 200 prevents the retractable hook 24 from moving beyond a predetermined point and out of the housing.

In use, the telephone holder 10 is particularly well adapted for use in a vehicle to receive and store portable telephones which may have a range of dimensions. The flexible tube 20 has one end bolted to the floor or other convenient location of the vehicle, while the base plate 18 is secured to the lower housing 16 by means of bolts 170 and nuts 160. When the telephone is being transported in the vehicle and is not in use, it is cradled in the telephone holder, lying on the support plate 26, and being firmly clamped between the fixed gripper members 71 and 72, and the movable gripper members 118 and 120. Prior to locating the telephone on the support plate 26, the arm assembly 22 is manually pushed such that the movable gripper members 118 and 120 move away from the fixed gripper members 71 and 72 widening the space therebetween by an amount in excess of the width of the telephone. Once the telephone has been placed on the support plate 26, the arm assembly is released, and the spring 128 urges the movable gripper members 118 and 120 towards the fixed gripper members 71 and 72, and the telephone is held firmly in position. It will thus be appreciated that the width of the telephone is not substantially material and that the telephone holder 10 may accommodate telephones of widely varying widths.

In addition, the retractable hook 24 may also be moved by manually pushing or pulling it between the withdrawn and extended position. In the extended position, a hook is provided for hanging glasses or for such other use as may be convenient.

The outer surface 36 of the support plate 26 includes the semi-circular recess 76 so that the telephone holder 10 may be used for other purposes when not accommodating a phone. Thus, the semi-circular recess 76 would be ideal for receiving a cup which could be located in the space. The cup would be prevented from sliding across the outer surface 36 by virtue of the semi-circular recess 76, and the movable gripper members 118 and 120 would urge the cup against the fixed gripper members 71 and 72 to hold the cup in a reasonably firm manner.

The rectangular recess 78 on the outer surface 36 may typically be used for a sticker or the like upon which the telephone number of a phone stored in the holder is identified.

The invention is not limited to the precise construction of details hereinbefore described or illustrated. The telephone holder may be of any convenient shape or size, and comprised of such materials as best suited to the purpose. Any method of joining the upper and lower housings together may be provided, and the holder is not necessarily confined to use in a vehicle. For example, the holder may be used in a home or office for storing a telephone not in use. A means of attachment, if required, of the holder 10 to a surface or object may be other than using a base plate, tubular member 20 and bolts 170. Any appropriate adhesive or other method of securement may be employed. Further, the retractable hook may be omitted as may be the fixed gripper members. The telephone may be gripped between the movable gripper members and the lateral upstanding wall 66, for example, which may be shaped or contoured appropriately.

Furthermore, the means for moving or urging the movable gripper members in a direction towards the fixed gripper members may be other than the arm assembly 22, and spring 128, as described above. Any suitable form of insuring that the movable gripper members are biased in a direction towards the fixed gripper members may be used.

I claim:

1. A holding device for receiving and holding objects of different dimensions, the device comprising:
   a housing including a surface for receiving the object, an upper body member which defines the surface, and a lower body member affixed to the upper body member, the upper and lower body members defining a chamber;
   a fixed gripper on the housing;
   a movable gripper movable between a first position wherein the movable and fixed grippers are spaced apart from each other and a second position wherein the movable and fixed grippers are spaced apart by a distance greater than that in the first position, the movable gripper comprising a movable arm assembly having a U-shaped member with a web portion located in the chamber and two extending arm portions with a gripper member at the free end thereof outside of the chamber, the surface of the housing including a slot, the U-shaped member being movable in the slot so that the two extending arm portions may move between the inside and the outside of the chamber;
   biasing means for biasing the movable gripper towards the first position.

2. A holding device as claimed in claim 1 wherein the surface on the housing is substantially rectangular in shape.

3. A holding device as claimed in claim 1 wherein the fixed gripper is located at one side of the upper body member.

4. A holding device as claimed in claim 1 wherein the upper body member includes two adjacent upwardly extending walls to prevent sliding of the object received thereon.

5. A holding device as claimed in claim 4 wherein the fixed gripper are located on an upwardly extending wall.

6. A holding device as claimed in claim 1 wherein two slots are provided in the surface of the housing, each slot being adapted to receive one of the extending arm portions of the U-shaped member.

7. A holding device as claimed in claim 6 wherein the fixed gripper is located on one side of the housing, and the gripper members are on the opposite side of the housing and movable so as to vary the distance between the fixed gripper and the gripper members.

8. A holding device as claimed in claim 1 wherein the surface of the housing includes a semi-circular recess between the fixed gripper and the movable gripper, the recess being adapted to receive the base of a cup and to prevent sliding thereof, the cup capable of being held between the fixed and the movable grippers.

9. A holding device as claimed in claim 1 wherein each extending arm portion has an elongate raised ridge thereon, the housing has a pair of elongate grooves on an inner surface thereof, each raised ridge being adapted for receipt in a groove thereby facilitating accurate and controlled movement of the U-shaped member between the first and second positions.

10. A holding device as claimed in claim 9 further comprising a central groove, the web portion having a protrusion approximately midway along its length, the protrusion being received in the central groove to further facilitate accurate movement of the U-shaped member between the first and second positions.

11. A holding device as claimed in claim 1 wherein the web portion and two extending arm portions move between the first and second positions in a direction parallel to the surface of the housing, each gripper member at the end of each arm portion being substantially normal to the extending arm portion.

12. A holding device as claimed in claim 1 wherein the biasing means comprises a spring mounted on the web portion of the U-shaped member, one portion of the spring acting on the web portion, and the other portion of the spring acting on the housing, wherein the spring is arranged so as to bias the U-shaped member toward the first position.

13. A holding device as claimed in claim 12 wherein the spring comprises a coil spring with two radiating spring arms, the coil spring being bolted to the web portion with the radiating arms being received in spring securing means on the housing.

14. A holding device as claimed in claim 13 wherein the spring securing means comprises: a first pair of upstanding projections adjacent an extending arm, the upstanding projections defining a gap therebetween for receiving one radiating spring arm, and a second pair of upstanding projections located adjacent the other extending arm, the second pair of upstanding projections defining a gap therebetween for receiving the other radiating spring arm.

15. A holding device as claimed in claim 1 further comprising a retractable hook member on the housing.

16. A holding device as claimed in claim 15 wherein the retractable hook member is movable between a withdrawn position in the housing and an extended position wherein it projects outside of the housing.

17. A holding device as claimed in claim 16 wherein the retractable hook member has edges which ride on a pair of tracks in the housing.

18. A holding device as claimed in claim 1 wherein the housing includes an attachment plate whereby the holding device may be attached to a surface or object.

* * * * *